March 5, 1935. C. L. BRACKETT 1,993,473
VALVE ASSEMBLY
Filed March 7, 1930
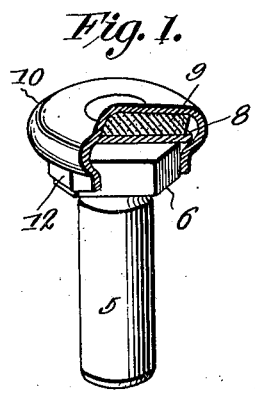
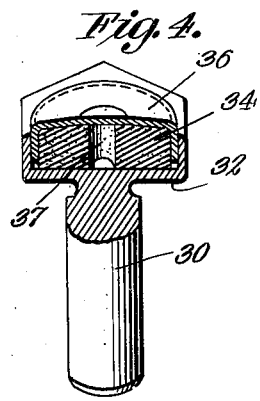
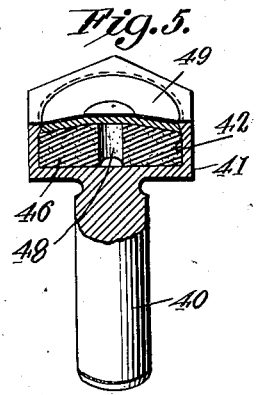
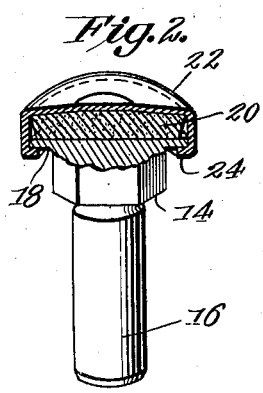
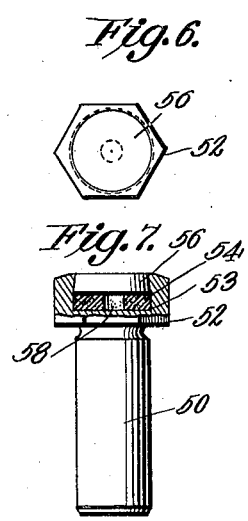
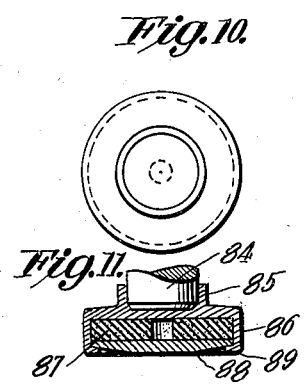
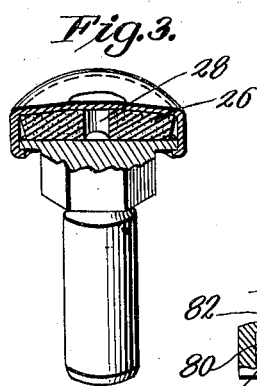
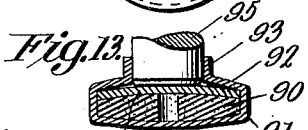
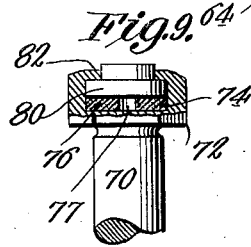
Inventor
CLARE L. BRACKETT
By
J. G. Quesada
Attorney Patented Mar. 5, 1935

1,993,473

UNITED STATES PATENT OFFICE 1,993,473

VALVE ASSEMBLY

Clare L. Brackett, Detroit, Mich.

Application March 7, 1930, Serial No. 434,008

6 Claims. (Cl. 123—90)

This invention relates to valve assemblies for internal combustion engine use.

Briefly, the invention will be found to provide for uninterrupted contact between the valves of an internal combustion engine and the operating means for such valves with the resulting elimination of the noise that is known to accompany the now usual intermittent engagement of tappet screws or other motion transmitting means with the associated valves; the uninterrupted contact of the valves with the operating means therefor being made possible without impairing the ability of the valves to be seated fully under the influence of the springs thereof even though temporary longitudinal expansion or contraction of the valve stems may have been caused by variation of the motor temperature.

The invention in its more specific aspects resides in a yieldable motion transmitting means adaptable for ready incorporation in the valve assembly of a motor of conventional or other design without elaborate change in the latter and which when in place will not interfere with expeditious adjustment of the valve assembly and which in fact, will avoid the necessity of frequent adjustment of the valve assembly.

Among other attributes of the invention are included the structural details by which economical manufacture, reliable performance and long life are accomplished.

In the accompanying drawing forming a part of this application and in which like numerals are employed to designate like parts throughout the same, Figure 1 is a sectional perspective illustrating the inventive idea carried out in connection with a tappet screw, Figure 2 is a sectional perspective illustrating a modification of the invention, Figure 3 is a sectional perspective illustrating a further modification of the invention, Figure 4 is a sectional perspective illustrating another modification of the invention, Figure 5 is a sectional perspective illustrating a still further modification of the invention, Figure 6 is a top plan view illustrating another expression of the invention, Figure 7 is a vertical sectional view through another variation of the invention, Figure 8 is a fragmentary vertical sectional view illustrating another modification of the invention, Figure 9 is a fragmentary vertical sectional view of a tappet screw embodying a modification of the invention, Figure 10 is an end view of a modified expression of the invention, Figure 11 is a detail sectional view through the form of invention illustrated in Figure 10, Figure 12 is an end view of another form of the invention, Figure 13 is a fragmentary sectional view of the form of invention illustrated in Figure 12, Figure 14 is a fragmentary vertical sectional view illustrating another embodiment of the invention.

With reference to the drawing and more particularly Figure 1, it will be seen that the shank 5 of a tappet screw has a polygonal sided head 6 formed integral therewith. A disk 8 of a greater diameter than the maximum diameter of the head 6 is mounted on the head and constitutes a support for a disk shaped pad or resilient motion transmitting element 9.

In carrying out the form of invention illustrated in Figure 1, the resilient motion transmitting pad 9 and the supporting disk thereof are enclosed within the crown 10 of a metallic cap.

The lower portion or skirt of the cap shown in Figure 1 is crimped inward to form a polygonal sided attaching member 12 snugly and slidably embracing the head 6. By crimping the cap inward, the attaching portion 12 is defined and at the same time the cap is formed with an internal annular shoulder engaging the peripheral portion of the disk 8 and thereby confining the same, along with the pad 9, to the crown of the cap. Thus, the resilient motion transmitting pad 9, the supporting element 8 thereof and the enclosing cap form a unit capable of ready application as such to the head 6. In this connection, it might be noted that the cap, including the resilient motion transmitting means located therein, will be found adaptable for application to a motor either during manufacture or at any time thereafter without change in the design of the motor or impairing the operation of the motor.

In use, the tappet screw may be adjusted to bring the upper surface of the cap into contact with the lower end of the associated valve stem and since the pad 9 is more readily compressible than the valve spring of the associated valve, the initial phase of the upward movement of the tappet screw will results in compression of the pad 9, after which the spring of the valve is overcome and the valve is moved to open position. Downward movement of the tappet screw, and more specifically the final phase of such movement, will be accompanied by expansion of the pad 9 so that the upper surface of the cap will remain in contact with the lower end of the valve stem, all to the end that uninterrupted engagement between the tappet screw and the valve stem is avoided, this feature of the invention being calculated to overcome the noise incident to the intermittent engagement of valve stems by the operating means therefor.

Figure 1 illustrates that the cushioning element 9 has the periphery thereof spaced inward from the side wall of the cap to cooperate therewith in the formation of an annular space allowing for radial expansion of the pad when subjected to axial compression.

The central portion of the crown 10 of the cap may be hardened to present a wear resisting surface to the end of the valve stem. Since the polygonal sided attaching portion 12 closely embraces the polygonal sided head 6 of the tappet screw, the jaws of a wrench may be applied directly to said attaching portion to adjust the valve assembly. However, the intervention of the yieldable motion transmitting pad 9, which allows constant contact between the crown 10 and the valve stem, makes unnecessary frequent adjustment of the valve assembly.

The disk 8 confines the pad 9 to the crown 10 and thereby prevents the pad from crowding between the attaching portion 12 and the head 6.

In the form of invention illustrated in Figure 2, the polygonal sided head 14 of the tappet screw 16 is provided with an annular extension or flange 18 having the upper surface thereof flush with the top of the head to cooperate therewith in forming a support for a yieldable motion transmitting element or pad 20. The motion transmitting element 20 which is preferably in the nature of a disk is enclosed within a cap 22, the skirt or body of which has the lower portion thereof formed with an inwardly directed annular flange 24 underlying the annular flange or extension 18 and cooperating therewith in holding the cap in place. It is believed to be obvious, that when the pad 20 is compressed as an incident to the ascent of the screw, the annular flange 24 will move away from the annular extension 18 and when the pad 20 expands, contact between the flanges 18 and 24 is reestablished.

The pad 20 is shown to have the periphery thereof spaced inward from the side wall of the cap 22 to cooperate therewith in the formation of an annular space by which compression of the pad is allowed.

In the form of invention illustrated in Figure 3, the compressible pad 26 is formed with a central opening 28 providing a means by which the axial compression of the pad is permitted.

In the form of invention illustrated in Figure 4, the shank 30 of the tappet screw has a head 32 formed integral therewith, and the head is shown to be polygonal sided to furnish a means by which the jaws of a wrench may be engaged with the screw. Figure 4 illustrates that the head 32 is formed with a socket or recess opening out through the upper side thereof for the reception of a resilient motion transmitting element or pad 34 and the depending skirt or side of a cap 36. Of course, the pad 34 is adapted for axial compression as an incident to the initial phase of the ascent of the tappet screw and will be found to be provided with a central opening 37 allowing for such axial compression.

The depending side wall or skirt of the cap 36 has the lower edge thereof normally spaced above the bottom wall of the socket in the head 32 by the inherent expansive force of the pad 34 but after a predetermined compression of the pad 34 under the influence of the ascending tappet screw, the lower edge of the cap 36 will come into contact with the bottom wall of the socket in the head so that further compression of the pad is avoided.

The yieldable motion transmitting pads shown in Figures 1, 2, 3 and 4 will probably be of rubber and are protected from the deleterious effect of the motor oil by the enclosing caps, the upper portions of which are closed to shed oil.

In the form of invention illustrated in Figure 5, the shank of the tappet screw is designated by the numeral 40 and has a head 41 formed integral therewith. Of course, like in the form of invention illustrated in Figure 4, the head 41 is polygonal sided for the direct application of the jaws of a wrench thereto.

The head 41 is formed with a cylindrical recess or socket 42 opening out through the upper side thereof and receiving a pad or yieldable motion transmitting element 46, the side walls of the pad being engaged with the side walls of the socket 42, while the central portion of the pad is formed with an axial opening 48 providing for longitudinal compression of the pad.

The pad 46 is held in place within the socket 42 by a disk shaped retainer 49 which is, in turn, held in place in the socket by the inwardly swaged upper portion of the side wall of the socket 42. More specifically, the upper portion of the side wall of the socket 42 is bevelled inward and overhangs the oppositely bevelled edge portion of the disk 49 to hold the disk in place and at the same time to allow compression of the pad.

The valve stem engaging portions or areas of the tappet screw shown in Figures 1, 2, 3, 4 and 5, may be hardened to resist wear and may be slightly convexed or crowned to compensate for misalignment of the tappet screws and the associated valve.

In the form of invention illustrated in Figures 6 and 7, the tappet screw shank 50 is formed with a polygonal sided head 52 having a socket or recess 53 opening out through the upper side thereof for the reception of a resilient motion transmitting element or pad 54 and a hardened contact disk 56, the contact disk being held in place by the inwardly swaged side wall of the socket. More specifically, the upper portion of the wall of the socket 53 is swaged inward into contact with the tapering wall of the disk 56 to limit outward movement of the disk under the expansive force of the pad 54. Of course, to free the disk 56 from the initial binding effect of the swaging operation, it is merely necessary to tap the disk with a hammer, after which, the disk is free to move in response to expansion and compression of the associated pad. A central opening 58 extending entirely through the pad 54 allows of axial compression of the pad.

In the form of invention illustrated in Figure 8, the shank 60 of the tappet screw has a polygonal sided head 62 formed integral therewith. The head 62 has a concentric socket 63 opening out through the upper surface thereof and receiving a disk or other shaped yieldable motion transmitting pad 64 having a diameter less than the diameter of the socket to allow for axial compression and consequent spreading of the pad. A hardened tapering disk shaped contact element and retainer 68 is positioned within the socket 63 and is held in place by the inwardly swaged side walls of the opening, the inwardly swaged arrangement providing a simple means by which the outward movement of the disk is limited and inward movement of the disk allowed.

That is to say, the diameter of the base portion of the disk 68 or contact element is greater than the diameter of the outer portion of such element so as to define a peripheral base extension, which extension is overhung by the converging outer portions of the wall of the socket 63 to the end that the disk 68 is confined within the socket while at the same time the pad may expand and contract.

In the form of invention illustrated in Figure 9, the shank 70 of the tappet screw has a polygonal sided head 72 formed integral therewith and the head is provided with a concentric socket 74 opening out through the upper surface thereof for the reception of a disk-like yieldable motion transmitting element 76, the axial portion of which is formed with an opening 77 extending entirely therethrough to allow of limited axial compression of the element.

A contact disk 80 is positioned within the socket 74 and is abruptly reduced in diameter from the central to the upper portion thereof to define a shoulder or step overhung by an inwardly extending annular flange 82 forming a means by which the contact disk 80 is held in place. Of course, the contact element 80 is suitably hardened to resist the wear to which the same is subjected in use.

It will be seen that in the several modifications shown in Figures 5 to 9, inclusive, the several expansible pads are mounted within sockets along with hardened contact elements and that the diameters of the base portions of such contact elements are greater than the diameters of the outer portions of the several contact elements so as to define peripheral base extensions, such base extensions being overhung by the inwardly directed outer portions of the sides of the sockets, thereby allowing the pads to partake of the required expansion and contraction while at the same time the contact elements are allowed to function in the transmission of motion and to restrain the expansible pads.

In the form of invention illustrated in Figures 10 and 11, the lower portion of the valve stem 84 is snugly received within the socket formed by an upstanding annular flange 85 on the upper surface of an inverted cup 86. Figure 11 illustrates that the inverted cup 86 opens out through the lower end thereof and receives an annular resilient motion transmitting pad 87 held in place by a retaining and contact disk 88 which, in turn, is confined within the cup by the inwardly projecting annular flange 89 on the lower end of the cup. The retaining and contact disk 88 is increased in thickness toward the axis thereof and is suitably hardened to resist wear.

In the form of invention illustrated in Figures 12 and 13, the inherently resilient motion transmitting pad 90 is enclosed within a cap 91, the intermediate portion of which is crimped inward or offset to provide a retaining shoulder 92 and an attaching portion 93. The attaching portion 93 is of annular formation and cooperates with a disk 94 in the formation of a socket for the reception of the lower portion of a valve stem 95. The retaining disk 94 is of concavo-convex formation and is extended across the upper surface of the pad 90 to hold the same within the cup 91 and at the same time to retain the shape thereof.

An axial opening extending entirely through the pad 90 will be found to provide a simple means by which limited axial compression of the pad is allowed. In carrying out the form of invention illustrated in Figures 12 and 13, the tappet contacting portion of the cup 91 is suitably hardened.

The form of invention illustrated in Figure 14 embodies a tappet screw 96 having a polygonal sided head 97 formed integral therewith. The head 97 constitutes a support for a yieldable motion transmitting disk or pad 98 held in place by the depending skirt of the cap 99. The depending skirt of the cap 99 is polygonal sided and snugly receives the similarly shaped head 97 of the tappet screw. Since the shape of the screw head 97 corresponds to the shape of the attaching portion of the cap and the head is snugly received within such cap, the jaws of a wrench may be engaged with the cap for the purpose of adjusting the tappet screw. The cap 99 is shown to be provided with a centrally positioned protuberance adapted for engagement with the valve stem and such protuberance may be hardened to give the same the desired wear resisting properties.

Having thus described the invention, what is claimed is:

1. In a structure of the character described, a screw having a head formed with a socket having a side wall, an expansible motion transmitting pad within said socket, and a contact disk within said socket and resting upon said pad, the side wall of said socket being provided with means engaging said disk and limiting outward movement thereof under the expansive force of said motion transmitting pad whereby the surface of the contact disk is normally held flush with the top of said head producing the appearance of a unitary structure.

2. In a tappet screw, a body having a head formed with a socket opening out through the upper surface of the head, a pad of resilient material in said socket, a contact element in said socket and resting upon said pad, the edge of said disk and the opposed wall of said socket being oppositely inclined to limit outward movement of the disk producing the appearance of a one-piece structure.

3. In a tappet screw, a body having a head formed with a socket opening out through the upper surface of the head, a pad of resilient material in said socket, a contact element in said socket and resting upon said pad, the edge of said disk and the opposed wall of said socket being oppositely inclined to limit outward movement of the disk, the area of the pad being less than the area of that portion of the socket occupied by the pad allowing radial expansion of the pad and axial compression thereof.

4. In a structure of the character specified, a screw having a head formed with a socket opening out through the upper surface of the head, an expansible pad in said socket, a contact element within said socket and provided with an external shoulder, said head being provided with means overhanging and engaging said shoulder.

5. In a tappet screw, a body having a head formed with a socket, a resilient sound-absorbing pad in said socket, a contact element resting on said pad and positioned within said socket, said contact element being reduced in diameter intermediate the ends thereof thereby defining a shoulder, said head being provided with an inwardly directed flange overhanging said shoulder to limit outward movement of the contact element.

6. In a tappet screw, a body having a head formed with a socket opening out through the outer surface of the head, an expansible motion transmitting pad in said socket, a contact element in said socket and having a base portion seated upon said expansible pad, the diameter of the base portion of the contact element being greater than the diameter of the opposite end portion of the contact element thereby defining a peripheral base extension, said head being provided with means overhanging and restraining said base extension.

CLARE L. BRACKETT.